United States Patent
Nakamura

(10) Patent No.: US 6,819,501 B2
(45) Date of Patent: Nov. 16, 2004

(54) OPERATION RING ROTATIONAL STATE DETECTING DEVICE, LENS DEVICE, AND OPTICAL APPARATUS

(75) Inventor: Hidekazu Nakamura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 52 days.

(21) Appl. No.: 10/302,847

(22) Filed: Nov. 25, 2002

(65) Prior Publication Data

US 2003/0107821 A1 Jun. 12, 2003

(30) Foreign Application Priority Data

Dec. 12, 2001 (JP) .......................... 2001-378224

(51) Int. Cl.[7] .............................................. G02B 15/14
(52) U.S. Cl. ..................................................... 359/701
(58) Field of Search ................................ 359/694, 699, 359/700, 701, 702, 703, 823

(56) References Cited

U.S. PATENT DOCUMENTS

| | | | | |
|---|---|---|---|---|
| 5,172,149 A | * | 12/1992 | Sekiguchi et al. ............. | 396/86 |
| 5,223,980 A | * | 6/1993 | Hamasaki .................... | 359/694 |
| 5,576,894 A | * | 11/1996 | Kuwana et al. .............. | 359/701 |
| 5,969,886 A | * | 10/1999 | Sato et al. ................... | 359/813 |
| 5,973,857 A | * | 10/1999 | Kaneda ....................... | 359/701 |

* cited by examiner

Primary Examiner—Ricky Mack
(74) Attorney, Agent, or Firm—Fitzpatrick, Cella, Harper & Scinto

(57) ABSTRACT

A rotational state detecting device including operation rings provided so as to be rotatable about a first axis, the operation rings each being rotated by external operation; support shafts each provided so as to be rotatable about a second axis different from the first axis; disk-shaped scales each supported by a respective one of the support shafts; sensors each detecting the rotation of a respective one of the scales; and rotation transmitting mechanisms for respectively transmitting the rotation of each of the operation rings to a respective one of the support shafts.

23 Claims, 6 Drawing Sheets

OPERATION RING ROTATIONAL STATE DETECTING DEVICE, LENS DEVICE, AND OPTICAL APPARATUS

BACKGROUND OF THE INVENTION

1. Field of the Invention

The present invention relates to a rotational state detecting device, a lens device, and an optical apparatus.

2. Description of the Related Art

A video camera and a digital camera each have a manual operation ring for providing a drive instruction to a drive unit in a zooming optical system or a focusing optical system. Rotational states such as a rotational amount and a rotational direction when operating the operation ring are detected by a rotational state detecting device. An example of such a rotational state detecting device is a device using photo-interrupters or encoders.

FIG. 5 shows a conventional optical type rotational state detecting device using photo-interrupters.

Referring to FIG. 5, reference numeral 19 denotes an operation ring such as a manual operation ring. The operation ring 19 has a slit disk 19a integrally provided on the inner peripheral side thereof. The slit disk 19a has many slits radially formed. When the operation ring 19 is rotationally operated, the slit disk 19a also rotates integrally therewith. By this rotation, the slits of the slit disk 19a are detected (i.e., a transmitting state and a blocked state of a detecting light are detected) by photo-interrupters 20, and counting is performed. Thereby, the rotational amount of the operation ring 19 is detected. The purpose of providing two photo-interrupters as shown in FIG. 5 is to detect the rotational direction of the operation ring 19. Thus, by detecting slits of the slit disk 19a by the two photo-interrupters 20, rotational states such as a rotational amount and a rotational direction, of the operation ring 19 are detected, and the detected signals are outputted from the photo-interrupters.

Another example of a device for detecting a rotational state of an operation ring is a rotational state detecting device using MR sensors (magnetoresistive effect elements).

FIG. 6 shows a conventional magnetic type rotational state detecting device using an MR sensor.

As shown in FIG. 6, at the inner diameter portion of the operation ring 19, a magnetic scale 21, on which mutually different magnetic poles are alternately formed, is integrally provided. Reference numeral 22 denotes an MR sensor. The MR sensor 22 is spaced apart from the magnetized surface of the magnetic scale 21 by a predetermined distance. As the operation ring 19 is rotationally operated, the magnetic scale 21 also integrally rotates. Based on this rotation, the change of each of the magnetic poles in the magnetic scale 21 is detected by the MS sensor 22, and the detection signals are outputted from the MR sensor.

As described above, when manually operating a zooming optical system or a focusing optical system in an optical system such as a lens device, a video camera, or a digital still camera, the rotational state of the operation ring is detected by an optical or magnetic type rotational state detecting device, and the zooming optical system or the focusing optical system is caused to operate in response to the output signals as a result of the detection.

In recent lens devices and optical apparatuses (e.g., video cameras, digital still cameras), as the miniaturization of the apparatuses progresses, attempts to reduce the size of optical systems (e.g., lens devices) are also being made. In order to miniaturize an optical system, it is necessary to improve the resolution of the stop position of a scaling (zooming) optical system and a focusing optical system, and hence, it is necessary to improve detection resolution for the rotational states of the operation rings for manually operating zooming and focusing.

In the above-described optical type rotational state detecting device, the resolution for the rotational position of the operation ring is determined by the pitch of the slits formed on the slit plate. It is, therefore, necessary to reduce the pitch size of the slits. However, it is difficult to make the pitch size smaller than the current conditions because of the limitations of machining. This constitutes a problem in that for the conventional optical type rotational state detecting device it is difficult to improve the resolution over the current conditions.

On the other hand, in the conventional magnetic type rotational state detecting device, the rotational mechanism portion of the operation ring requires a certain level of clearance. Therefore, when the operation ring is rotated, the distance between the magnetic scale integrally provided on the operation ring and the MR sensor may change. Due to this change in distance, the output signal from the MR sensor may fluctuate. This raises a problem in that the correct rotational state of the operation ring cannot be detected.

SUMMARY OF THE INVENTION

Accordingly, it is an object of the present invention to solve the above-described problems, and provide a rotational state detecting device, a lens device, and an optical apparatus that are capable of correctly detecting the rotational states of operation rings, and that allow the miniaturization of the apparatus.

To achieve the above-described object, a rotational state detecting device according to the present invention includes operation rings each provided so as to be rotatable about a first axis, the operation rings each being rotated by external operation; support shafts provided so as to be rotatable about a second axis different from the first axis; disk-shaped scales each supported by a respective one of the support shafts; sensors each detecting the rotation of a respective one of the scales; and rotation transmitting mechanisms for respectively transmitting the rotation of each of the operation rings to a respective one of the support shafts.

A lens device according to the present invention includes a fixed cylinder having an optical axis; a lens unit moving in the direction of the optical axis of the fixed cylinder; operation rings each provided so as to be rotatable about the optical axis of the fixed cylinder, the operation rings each being rotated by external operation; support shafts each provided so as to be rotatable about an axis parallel to the optical axis; disk-shaped scales each supported by a respective one of the support shafts; sensors each detecting the rotation of a respective one of the scales; and rotation transmitting mechanisms for respectively transmitting the rotation of each of the operation rings to a respective one of the support shafts.

An optical apparatus according to the present invention, comprising a photographing optical system and an image pickup device that picks up images formed by the photographing optical system, includes a fixed cylinder having an optical axis; lens units moving in the direction of the optical axis of the fixed cylinder; actuators each driving a respective one of the lens units; operation rings each provided so as to be rotatable about the optical axis of the fixed cylinder, the operation rings each being rotated by external operation; support shafts each provided so as to be rotatable about an axis parallel to the optical axis; disk-shaped scales each supported by a respective one of the support shafts; sensors each detecting the rotation of a respective one of the scales; rotation transmitting mechanisms for respectively transmitting the rotation of each of the operation rings to a respective one of the support shafts; and controllers each controlling the driving of a respective one of the actuators in response to an output from a corresponding one of the sensors.

In another aspect, the present invention relates to a device comprising (a) a manual operation ring rotatable about an optical axis of the apparatus; (b) a support shaft rotatable about an axis parallel to the optical axis; (c) a disk-shaped scale supported by the support shaft; (d) a rotation transmitting mechanism that is configured to transmit the rotation of the manual operation ring to the support shaft; and (e) a sensor configured to detect the rotation of the disk-shaped scale.

In yet another aspect, the present invention relates to a device comprising (a) means for coupling a manual operation ring on a lens device to a magnetic scale having a diameter smaller than the manual operation ring so that rotation of the manual operation ring causes rotation of the magnetic scale; and (b) means for detecting rotation of the magnetic scale.

Further objects, features and advantages of the present invention will become apparent from the following description of the preferred embodiments with reference to the attached drawings.

DESCRIPTION OF THE PREFERRED EMBODIMENTS

Hereinafter, the embodiments according to the present invention will be described with reference to the accompanying drawings.

Figure 1:
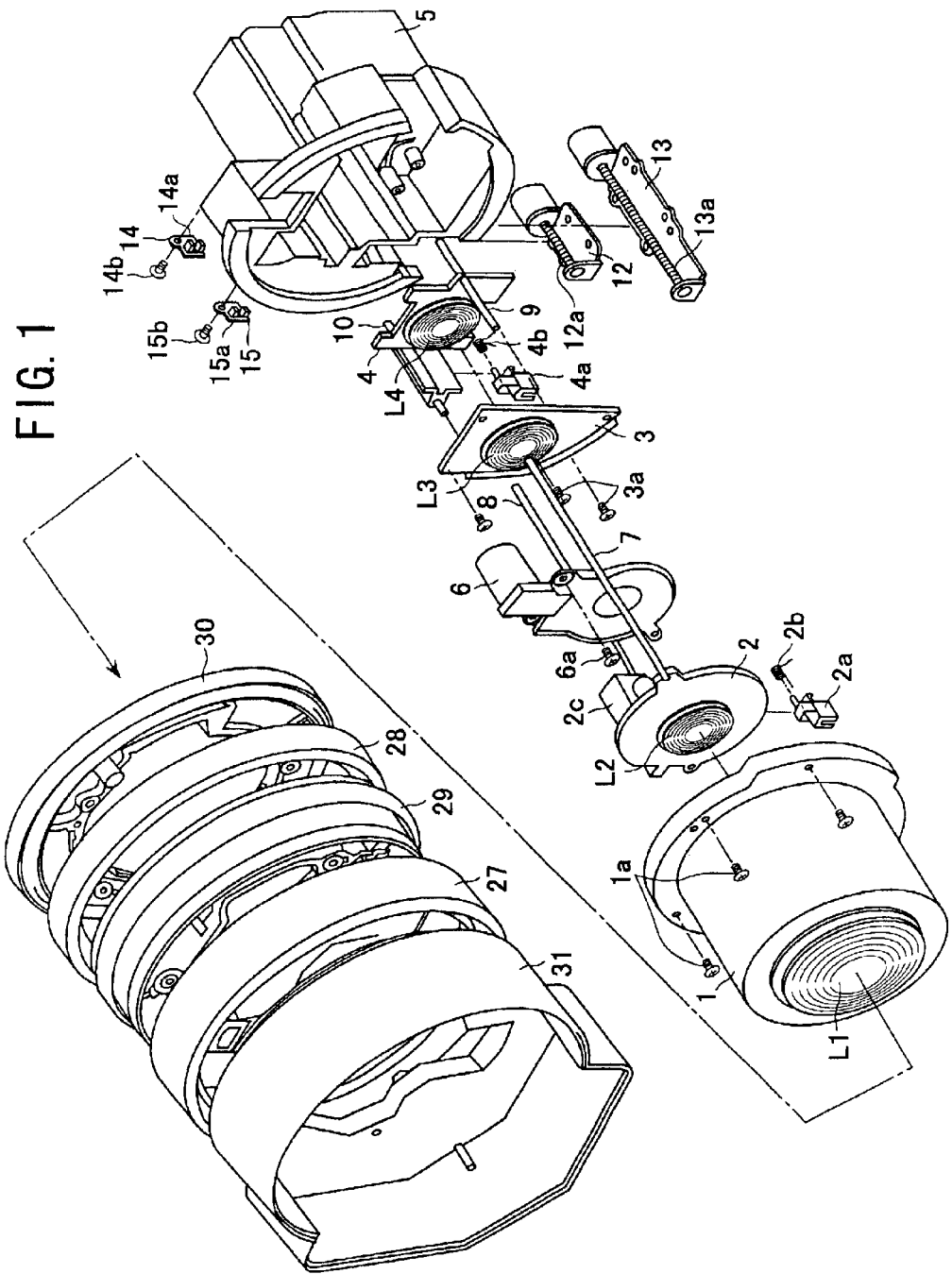
FIG. 1 is an exploded perspective view showing a lens device according to an embodiment of the present invention.

FIG. 1 is an exploded perspective view showing an entire lens barrel (lens device) to which an embodiment of the present invention is applied. This lens device is provided with four lens groups having positive, negative, positive, and positive optical powers in this order from the object (subject) side, and constitutes a photographing lens (or lens portion) of an optical apparatus such as a video camera or a digital still camera.

Referring to FIG. 1, reference numeral L1 designates a fixed first lens group, reference numeral L2 second lens group that performs a scaling (zooming) operation by moving in the optical axis direction, reference numeral L3 a fixed third lens group, and reference numeral L4 a fourth lens group that performs a focusing operation by moving in the optical axis direction.

Reference numeral 1 designates a fixed lens barrel for holding the first lens group L1, reference numeral 2 a second-group moving frame for holding the second lens group L2, reference numeral 3 a third-group holding frame for holding the third lens group L3, reference numeral 4 a fourth-group moving frame for holding the fourth lens group L4, and reference numeral 5 a rear lens barrel to which an image pickup element such as a CCD or a CMOS sensor is attached.

The fixed lens barrel 1 and the rear lens barrel 5 position and fix two guide bars 7 and 8. The second-group moving frame 2 is supported by the guide bars 7 and 8 so as to be movable in the optical axis direction.

The third-group holding frame 3 and the rear lens barrel 5 position and fix two guide bars 9 and 10. The fourth-group moving frame 4 is supported by the guide bars 9 and 10 so as to be movable in the optical axis direction. The third-group holding frame 3 is positioned and fixed to the rear lens barrel 5 with a screw 3a.

Reference numeral 6 designates a diaphragm unit for varying the aperture diameter of a photographing optical system. The diaphragm unit 6 is a so-called iris diaphragm that varies the aperture diameter by opening/closing six diaphragm blades. The diaphragm unit 6 is fixed to the rear lens barrel 5 with a screw 6a.

The fixed lens barrel 1 is positioned to the rear lens barrel 5, and then fixed to the rear lens barrel 5 with screws 1a.

Reference numeral 12 designates a stepping motor unit that is a focusing drive unit for driving the fourth-group moving frame 4 in the optical axis direction. The stepping motor 12 has a lead screw 12a integrally formed on the output shaft thereof. A rack 4a affixed to the fourth-group moving frame 4 is meshed with the lead screw 12a. As a result, as the stepping motor unit 12 rotates, the fourth-group moving frame 4 is moved in the optical axis direction by the meshing action between the lead screw 12a and the rack 4a, while being guided by the guide bars 9 and 10.

The fourth-group moving frame 4, the guide bar 10, the rack 4a, and the lead screw 12a are arranged so that the biasing by backlashes thereamong are prevented by the energizing force of a torsion coil spring 4b.

Reference numeral 13 designates a stepping motor unit that is a scaling (zooming) drive unit for driving the second-group moving frame 2 in the optical axis direction. The stepping motor 13 has a lead screw 13a integrally formed on the output shaft thereof. A rack 2a affixed to the second-group moving frame 2 is meshed with the lead screw 13a. As a result, as the stepping motor unit 13 rotates, the second-group moving frame 2 is moved in the optical axis direction by the meshing action between the lead screw 13a and the rack 2a, while being guided by the guide bars 7 and 8.

The second-group moving frame 2, the guide bar 8, the rack 2a, and the lead screw 13a are arranged so that the biasing by backlashes thereamong are prevented by the energizing force of a torsion coil spring 2b.

These stepping motors 12 and 13 are each fixed to the rear lens barrel 5 with a screw (not shown).

Reference numeral 14 designates a focus reset switch constituted of a photo-interrupter. The focus reset switch 14 outputs an electric signal in response to the light blocking state and the light transmitting state that occur when a light blocking portion (not shown) formed in the fourth-group moving frame 4, moving in the optical axis direction, comes in and out between a light emitting portion (light emitter) and a light receiving portion (light receiver). By the output of this electric signal, a CPU, which is described later, can detect whether the fourth lens group L4 is positioned at the reference position thereof. The focus reset switch 14 is fixed to the rear lens barrel 5 with a screw 14b through a substrate 14a.

Reference numeral 15 designates a zoom reset switch constituted of a photo-interrupter. The switch 15 outputs an electric signal in response to the light blocking state and the light transmitting state that occur when a light blocking portion 2c formed in the second-group moving frame 2, moving in the optical axis direction, comes in and out between the light emitting portion and the light receiving portion. By the output of this electric signal, the CPU, which is described later, can detect whether the second lens group L2 is positioned at the reference position thereof. The zoom reset switch 15 is fixed to the rear lens barrel 5 with a screw 15b through a substrate 15a.

Figure 2:
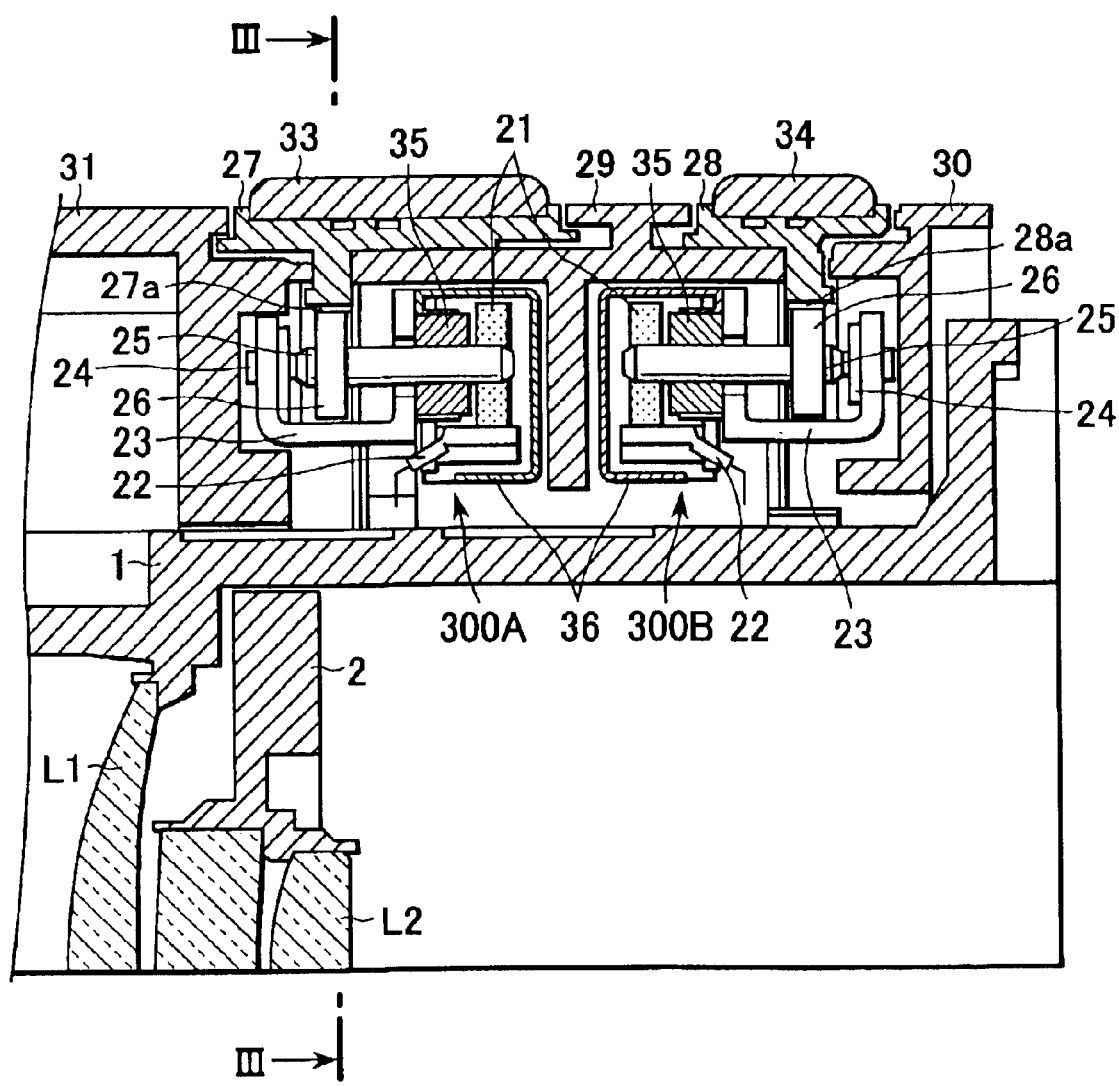
FIG. 2 is a sectional side view illustrating the peripheries of the rotational state detecting device in the lens device shown in FIG. 1.

As shown in FIGS. 1 and 2, reference numeral 27 denotes a manual focus ring, and reference numeral 28 denotes a manual zoom ring. The manual focus ring 27 and the manual zoom ring 28 are each rotatably fixed to the outer periphery of an intermediate lens barrel 29.

The manual focus ring 27 is mounted on the outer peripheries of the intermediate lens barrel 29 and a front-side retaining member (lens barrel) 31, and is inhibited from its rotatable movement in the optical axis direction exceeding the minimum clearance by being sandwiched between the intermediate lens barrel 29 and the front-side retaining member 31. On the other hand, the manual zoom ring 28 is mounted on the outer peripheries of the intermediate lens barrel 29 and a rear-side retaining member (lens barrel) 30, and is inhibited from its rotatable movement in the optical axis direction exceeding the minimum clearance by being sandwiched between the intermediate lens barrel 29 and the rear-side retaining member 30.

Figure 3:
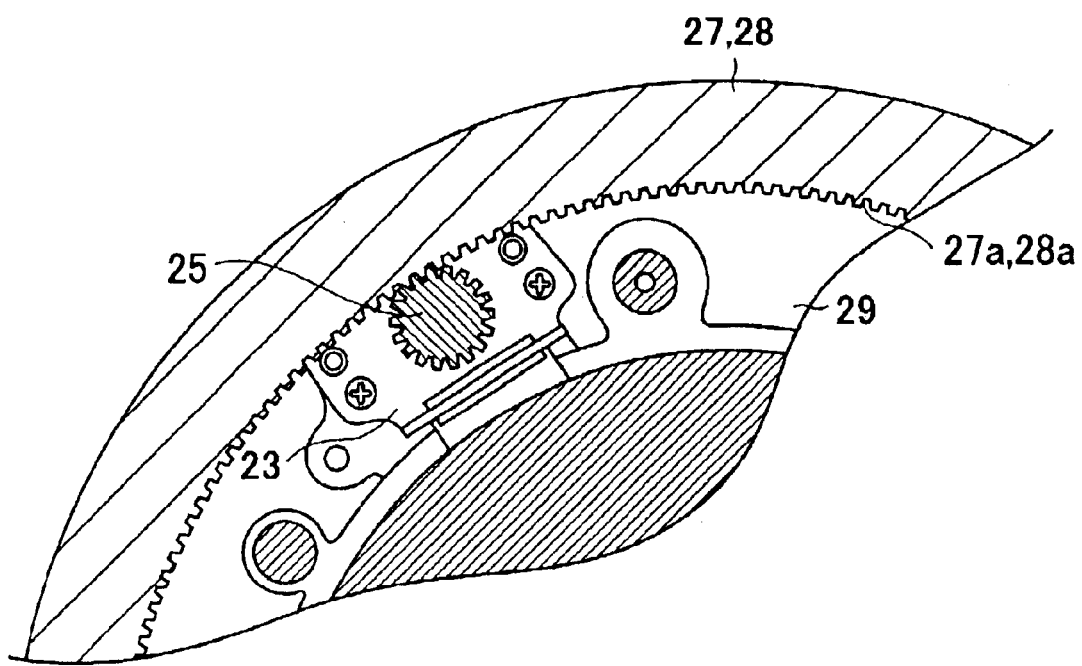
FIG. 3 is a partially sectional front view illustrating the rotational state detecting device in the lens device shown in FIG. 1.

FIGS. 2 and 3 illustrates the construction of the rotational state detecting device used in this embodiment to detect an operation amount (rotation amount) and an operational direction (rotational direction) of the manual focus ring 27 and the manual zoom ring 28. FIG. 2 is a sectional side view showing the construction of the peripheries of the rotational state detecting device, and FIG. 3 is a partially sectional front view taken along the line III—III indicated by the arrow in FIG. 2.

Referring to FIG. 2, reference numeral 33 denotes a rubber ring for preventing the manual focus ring 27 from slipping when being manually operated, and reference numeral 34 denotes a rubber ring for preventing the manual focus ring 28 from slipping when being manually operated. Here, the rear-side retaining member 30 is fixed to the fixed lens barrel 1 with a screw (not shown).

In FIG. 2, reference numeral 300A denotes an MR sensor unit for detecting a rotational displacement of the focus ring 27, and reference numeral 300B denotes an MR sensor unit for detecting a rotational displacement of the zoom ring 28. These two units have constructions similar to each other.

The sensor unit 300A (or 300B) has a casing member 23 having a U-shape. The casing member 23 is fixed to the intermediate lens barrel 29. The casing member 23 has an output shaft 25 rotatably supported by a front-side bearing 24 and a rear-side bearing 35. A magnetic scale 21 is fixed to the output shaft 25. The magnetic scale 21 has a disk (or cylinder) shape, and the outer peripheral surface thereof is a magnetized surface on which mutually different magnetic poles are alternately formed. On the magnetized surface, for example, 80 N-poles and 80 S-poles are alternately formed. Alternatively, however, the number of divided magnetized portions of the magnetized surface may be either more or less than 80 N-poles and 80 S-poles (i.e., more or less than 160 poles in total). It is essential only that the magnetized surface have a number of divided magnetized portions that are divided in accordance with a required detection resolution. Here, the outer dimension (diameter) of the magnetic scale 21 is smaller than that of either of the manual focus ring 27 and the manual zoom ring 28.

An MR sensor (magnetoresistive effect element) 22 is fixed to the casing member 23 so as to be spaced by a predetermined distance apart from the magnetized surface, which is the outer peripheral surface of the magnetic scale 21. The MR sensor 22 detects changes of the magnetic poles on the magnetized surface of the magnetic scale 21 (i.e., magnetic resistance), and outputs the magnetic changes in sine wave forms. Detecting portions (not shown) of the MR sensor 22 are provided at plural places such as two places at a pitch smaller than the magnetic pole pitch on the magnetized surface of the magnetic scale 21, such as a pitch equal to a quarter of the magnetic pole pitch, and the sine wave outputs from the plural detecting portions are outputted with the phases thereof shifted by 90 degrees with respect to each other. In this manner, based on the output signals from the detecting portions, the amount of rotational displacement (the count number of changes in the magnetic poles) and the rotational direction of the magnetic scale 21 are detected.

The output shaft 25 has a gear member 26 fixed thereto in an integral manner or by means of a press fit or adhesion. The casing member 23 has a magnetic shield member 36 that covers the magnetic scale 21 and the MR sensor 22. The casing member 23 is constructed so as to block outer magnetic fields by this magnetic shield member 36, thereby preventing the MR sensor 22 within the magnetic shield member 36 from being subjected to influence of the outer magnetic fields.

An inner diameter gear portion 27a is formed over the inner periphery of the manual focus ring 27, and an inner diameter gear portion 28a is formed over the inner periphery of the manual zoom ring 28. Gear members 26 of the MR sensor units are meshed with the respective inner diameter gear portions 27a and 28a. As a result, as the manual focus ring 27 or the manual zoom ring 28 rotates under a rotational operation, the gear member 26 on the side of the rotated ring is rotated in interlock with the ring, and thereby the output shaft 25 and the magnetic scale 21, which are disposed coaxially with the gear member 26, also rotate. As the result of this rotation, from the output signals produced by the above-described detecting portions of each of the MR sensors 22, the amount of rotational displacement (the count numbers of changes in the magnetic poles) and the rotational direction of each one of the magnetic scales 21 are detected, thereby allowing the rotation amount and the rotational direction of each of the manual focus ring 27 and the manual zoom ring 28 to be detected.

Next, an optical system of an optical apparatus, such as a video camera or a digital still camera, equipped with a lens barrel (lens device) using the MR sensor unit, which is the above-described rotational state detecting device, will be described with reference to FIG. 4 as a block diagram and FIG. 2.

Figure 4:
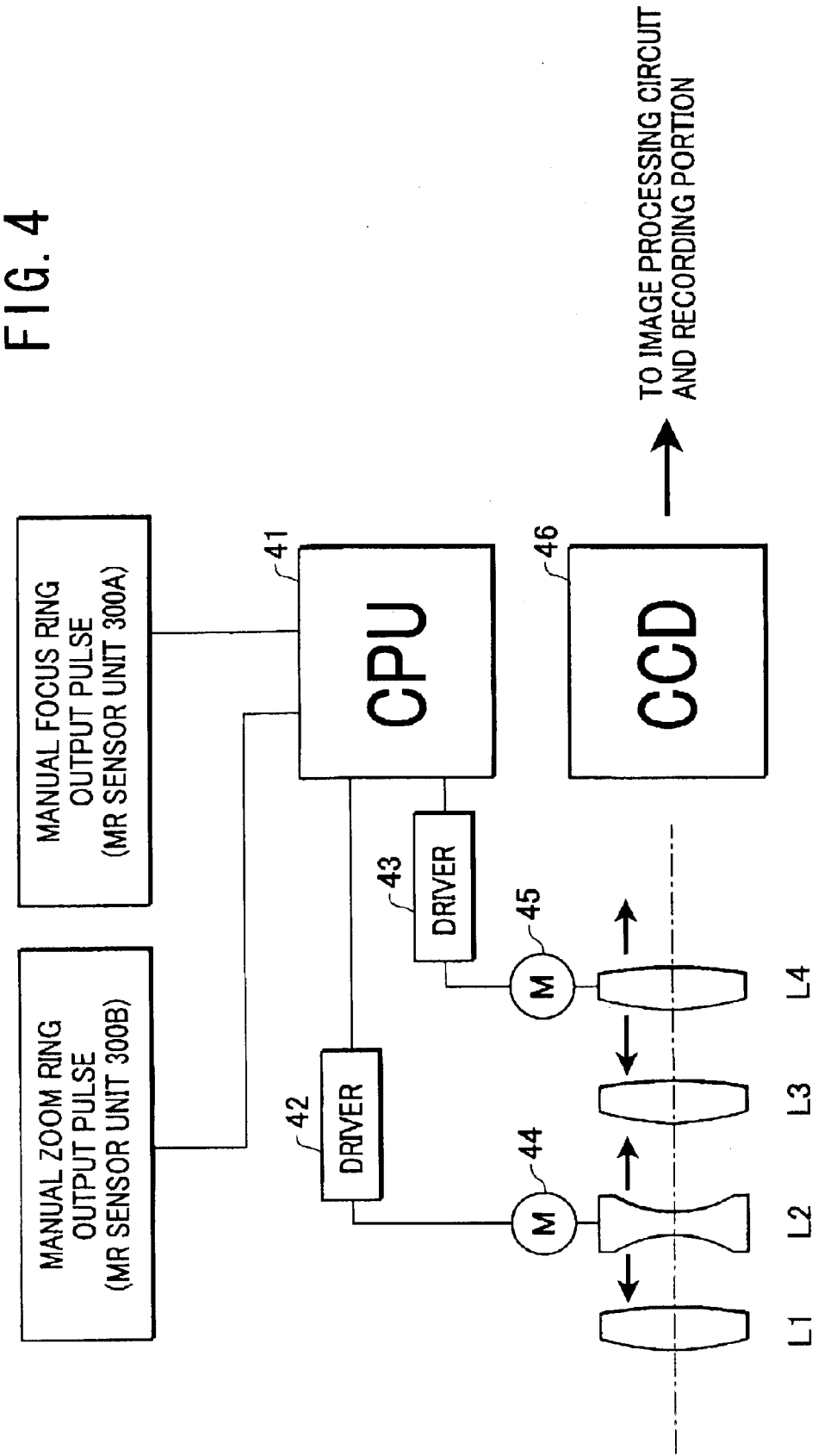
FIG. 4 is a block diagram showing the construction of an optical apparatus equipped with the lens device shown in FIG. 1.
Figure 5:
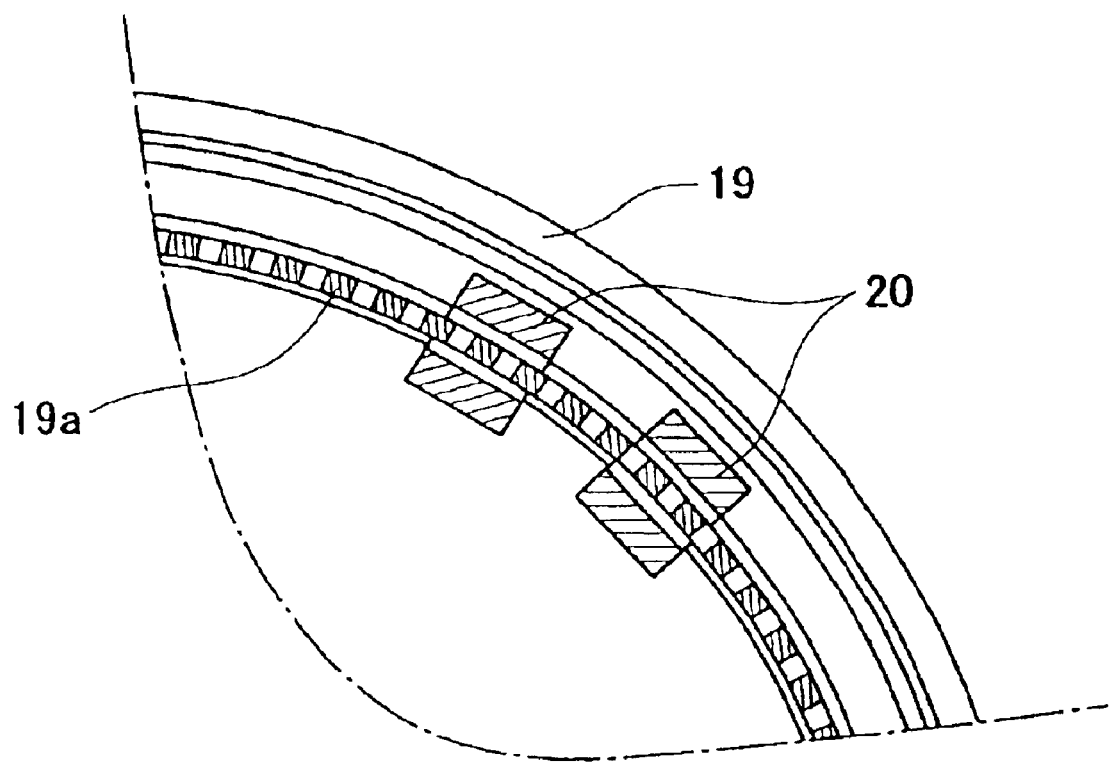
FIG. 5 is a sectional view explaining a conventional optical type rotational state detecting device.
Figure 6:
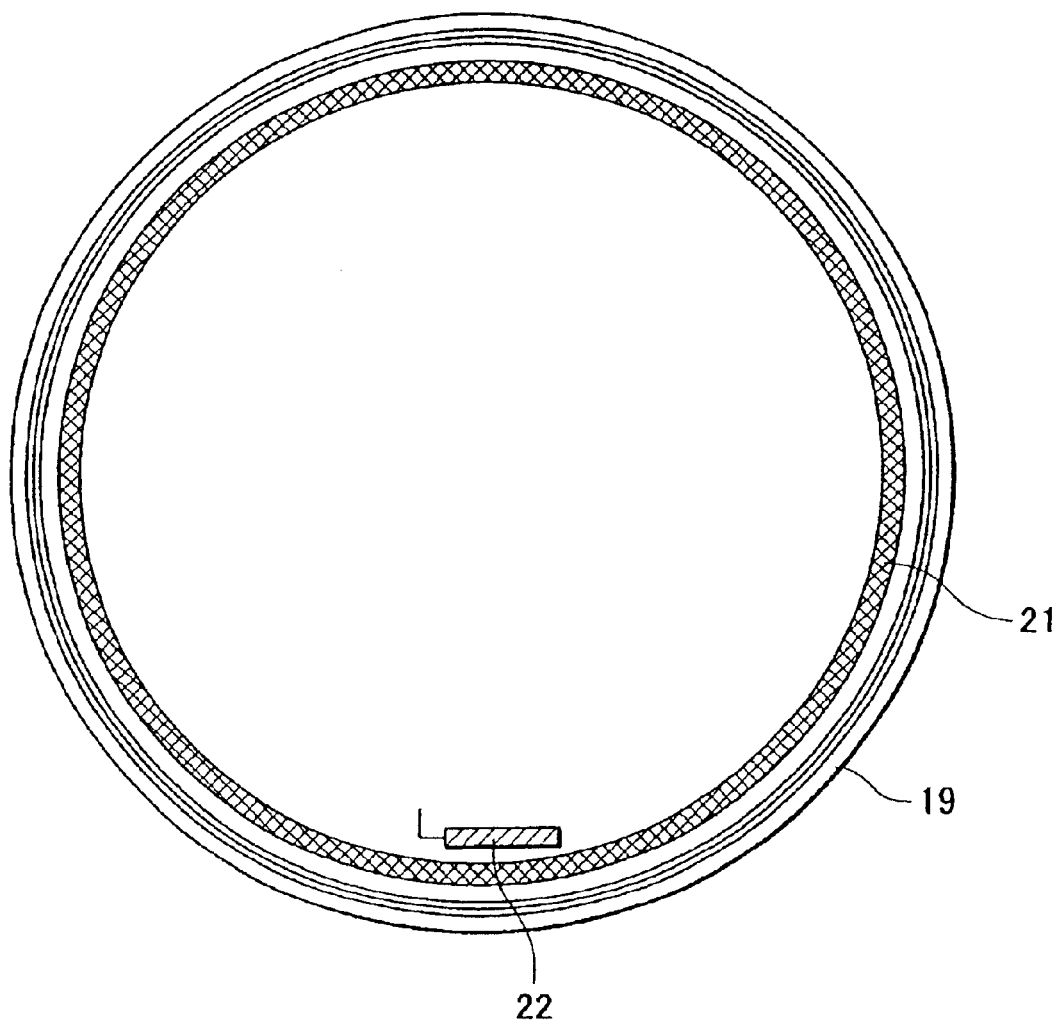
FIG. 6 is a sectional view explaining a conventional magnetic type rotational state detecting device.

When the manual focus ring 27 and the manual zoom ring 28 shown in FIG. 2 are rotationally operated, a relative movement occurs between the MR sensor 22 fixed to the casing member 23 and the magnetic scale 21 under a rotational movement, and consequently, output signals in response to the rotational displacements of the manual rings (i.e., manual focus ring 27 and manual zoom ring 28) are outputted from the respective MR sensors 22 of the MR sensor units 300A and 300B to the CPU 41 shown in FIG. 4. In FIG. 4, the CPU 41 performs arithmetic processing in response to each of the output signals, and supplies a drive signal to each of a zoom driver 42 and a focus driver 43. Thereby, a zoom motor 44 and a focus motor 45 are respectively driven by the drivers 42 and 43, and consequently, the second lens group (scaling) L2 and the fourth lens group (focusing) L4 in the scaling optical system, are moved to optical positions corresponding to the rotational displacements of the manual zoom ring 28 and the manual focus ring 27, respectively. The subject image photographed by the scaling optical system (L1 to L4) is formed on the image pickup surface (not shown) of a CCD 46, and is picked up by the CCD 46. Then, the image pickup signal is outputted to an image processing circuit and a recording portion, and predetermined image processing and recording of the image pickup signal are performed.

In the above-described embodiments, it is possible to arbitrarily change the output signal frequency by the MR sensor 22, by changing the acceleration/deceleration ratio (gear ratio) between the gear member 26 and each of the inner diameter gear portions 27a and 28a of the manual focus ring 27 and the manual zoom ring 28. It is also possible to arbitrarily change the output signal frequency by the MR sensor 22 by changing the magnetic pole pitch on the magnetized surface of the magnetic scale 21.

In the above-described embodiments, descriptions were made of a lens barrel having a scaling optical system constituted of the four groups with positive, negative, positive, and positive optical powers. However, the present invention is not limited to the above-described embodiments, but can be applied to lens devices with other optical constructions.

According to the above-described embodiments, in order to detect the rotation amount and the rotational direction of the manual focus ring and the manual zoom ring, which are operation rings, the present rotational state detecting device is arranged so that each of the magnetic scales connected to one of the manual rings by a gear mechanism, is rotated, and that this rotation is detected by the MR sensor. This allows the detection resolution with respect to the rotational state to be improved, thereby achieving a stable output characteristic.

In the above-described embodiments, the present rotational state detecting device is constructed so that each of the magnetic scales and a respective one of the MR sensors are caused to be integrally held by the casing member so as to be formed into one unit. This prevents the manual rings from being subject to the influences of backlashes during rotation, and eliminates the occurrence of changes in the distance between each of the magnetic scales and a respective one of the MR sensors, thereby attaining stable outputs of the sensors.

Also, in the above-described embodiments, references were made to a magnetic type rotational state detecting device using magnetic scales and MR sensors. However, the present invention can also be applied to an optical type rotational state detecting device using optical type scales and optical sensors. Namely, in the above described embodiments, the arrangement may be such that optical scales (e.g., slit plates) are provided instead of the magnetic scales, and that these optical scales are detected by optical sensors (e.g., light emitting/receiving elements such as photo-interrupters).

Except as otherwise disclosed herein, the various components shown in outline or in block form in the figures are individually well-known and their internal construction and operation are not critical either to the making or using of this invention or to a description of the best mode of the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of following claims is to be accorded the broadest interpretation so as to encompass all such modifications and equivalent structures and functions.

What is claimed is:

1. A rotational state detecting device, comprising:
    operation rings each provided so as to be rotatable about a first axis, said operation rings each being rotated by external operation;
    support shafts each provided so as to be rotatable about a second axis different from said first axis;
    disk-shaped scales each supported by a respective one of said support shafts;
    sensors each detecting the rotation of a respective one of said scales; and
    rotation transmitting mechanisms for respectively transmitting the rotation of each of said operation rings to a respective one of said support shafts.

2. A rotational state detecting device according to claim 1, wherein said disk-shaped scales are smaller than said operation rings.

3. A rotational state detecting device according to claim 1, wherein each of said disk-shaped scales is a magnetic scale having a magnetized surface on which mutually different magnetic poles are alternately formed, and wherein each of said sensors is a magnetic sensor for detecting magnetic changes of the magnetized surface of said magnetic scale.

4. A lens device including a photographing optical system, said lens device comprising:
    a fixed cylinder having an optical axis;
    a lens unit moving in the direction of the optical axis of said fixed cylinder;
    operation rings each provided so as to be rotatable about the optical axis of said fixed cylinder, said operation rings each being rotated by external operation;
    support shafts each provided so as to be rotatable about an axis parallel to the optical axis;
    disk-shaped scales each supported by a respective one of said support shafts;
    sensors each detecting the rotation of a respective one of said scales; and
    rotation transmitting mechanisms for respectively transmitting the rotation of each of said operation rings to a respective one of said support shafts.

5. A lens device according to claim 4, wherein said disk-shaped scales are smaller than said operation rings.

6. A lens device according to claim 4, wherein each of said disk-shaped scales is a magnetic scale having a magnetized surface on which mutually different magnetic poles are alternately formed, and wherein each of said sensors is a magnetic sensor for detecting magnetic changes of the magnetized surface of said magnetic scale.

7. An optical apparatus including a photographing optical system and an image pickup device that picks up images formed by said photographing optical system, said optical apparatus comprising:

a fixed cylinder having an optical axis;

lens units moving in the direction of the optical axis of said fixed cylinder;

actuators each driving a respective one of said lens units;

operation rings each provided so as to be rotatable about the optical axis of said fixed cylinder, said operation rings each being rotated by external operation;

support shafts each provided so as to be rotatable about an axis parallel to the optical axis;

disk-shaped scales each supported by a respective one of said support shafts;

sensors each detecting the rotation of a respective one of said scales;

rotation transmitting mechanisms for respectively transmitting the rotation of each of said operation rings to a respective one of said support shafts; and controllers each controlling the driving of a respective one of said actuators in response to an output from a corresponding one of said sensors.

8. An optical apparatus according to claim 7, wherein said disk-shaped scales are smaller than said operation rings.

9. An optical apparatus according to claim 7, wherein each of said disk-shaped scales is a magnetic scale having a magnetized surface on which mutually different magnetic poles are alternately formed, and wherein each of said sensors is a magnetic sensor for detecting magnetic changes of the magnetized surface of said magnetic scale.

10. An apparatus comprising:

a manual operation ring rotatable about an optical axis of said apparatus;

a support shaft rotatable about an axis parallel to said optical axis;

a disk-shaped scale supported by said support shaft;

a rotation transmitting mechanism that is configured to transmit the rotation of said manual operation ring to said support shaft; and a sensor configured to detect the rotation of said disk-shaped scale.

11. An apparatus according to claim 10, further comprising a driving unit that drives a lens unit along the optical axis in response to the detection by said sensor.

12. An apparatus according to claim 10, wherein said rotation transmitting mechanism comprises gearing that couples said manual operation ring to said support shaft.

13. An apparatus according to claim 12, wherein said disk-shaped scale has a diameter smaller than that of said manual operation ring.

14. A rotational state detecting device comprising:

means for coupling a manual operation ring on a lens device to a magnetic scale having a diameter smaller than the manual operation ring so that rotation of the manual operation ring causes rotation of the magnetic scale; and means for detecting rotation of the magnetic scale, wherein the manual operation ring has a gear portion formed on an inner periphery thereof, and said coupling means comprises (a) a gear that meshes with the gear portion of the manual operation ring and (b) a rotatable shaft upon which both said gear and the magnetic scale are fixed.

15. A device according to claim 14, wherein said gear has a smaller diameter than the manual operation ring.

16. A device according to claim 15, wherein the manual operation ring is a manual focus operation ring.

17. A device according to claim 15, wherein the manual operation ring is a manual zoom operation ring.

18. A device according to claim 15, further comprising means for driving a lens unit along an optical axis in accordance with the detection by said detecting means.

19. A device according to claim 14, wherein the manual operation ring and said gear are configured so as to have a step up gear ratio whereby each of said gear and the magnetic scale rotates more than one time for each rotation of the manual operation ring.

20. An optical apparatus comprising:

an operation ring rotatable about an optical axis of the optical apparatus;

a shaft which has a magnetic scale;

a rotation transmitting mechanism for transmitting rotation of said operation ring to rotation of said shaft; and a fixed member which has a bearing for supporting said shaft rotatably and a magnetic sensor for detecting rotation of said magnetic scale.

21. An apparatus according to claim 20, further comprising a driving unit for driving a lens unit along the optical axis in response to the detection by said magnetic sensor.

22. An apparatus according to claim 20, wherein said rotation transmitting mechanism comprises gearing which couples said operation ring to said shaft.

23. An apparatus according to claim 20, wherein said fixed member has a magnetic shield which covers said magnetic scale and said magnetic sensor.

* * * * *